(12) United States Patent
Wakuda et al.

(10) Patent No.: US 9,760,173 B2
(45) Date of Patent: Sep. 12, 2017

(54) ELECTRONIC APPARATUS AND VIBRATION CONTROL METHOD

(71) Applicant: ALPS ELECTRIC CO., LTD., Tokyo (JP)

(72) Inventors: Hiroshi Wakuda, Miyagi-ken (JP); Hajime Suzuki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 15/056,725

(22) Filed: Feb. 29, 2016

(65) Prior Publication Data

US 2016/0274665 A1    Sep. 22, 2016

(30) Foreign Application Priority Data

Mar. 18, 2015   (JP) .................................. 2015-055227

(51) Int. Cl.
| | |
|---|---|
| G06F 3/01 | (2006.01) |
| G06F 3/041 | (2006.01) |
| B06B 1/02 | (2006.01) |
| H02K 33/02 | (2006.01) |

(52) U.S. Cl.
CPC ............ *G06F 3/016* (2013.01); *B06B 1/0207* (2013.01); *G06F 3/0414* (2013.01); *H02K 33/02* (2013.01)

(58) Field of Classification Search
CPC ..... B06B 1/0207; G06F 3/016; G06F 3/0414; G06F 3/0416; G06F 2203/014; G06F 3/04886; H02K 33/00; H01H 2239/074
See application file for complete search history.

(56) References Cited

U.S. PATENT DOCUMENTS

| | | | |
|---|---|---|---|
| 2007/0097073 A1* | 5/2007 | Takashima | G06F 3/016 345/156 |
| 2010/0309141 A1* | 12/2010 | Cruz-Hernandez | G06F 3/016 345/173 |
| 2012/0287068 A1* | 11/2012 | Colgate | G06F 3/016 345/173 |
| 2012/0299859 A1* | 11/2012 | Kinoshita | G06F 3/016 345/173 |

(Continued)

FOREIGN PATENT DOCUMENTS

| | | |
|---|---|---|
| JP | 2009-87359 | 4/2009 |
| WO | 2013/186841 | 12/2013 |

*Primary Examiner* — Mirza Alam
(74) *Attorney, Agent, or Firm* — Beyer Law Group LLP

(57) ABSTRACT

Disclosed is controlling a vibration of a vibration generating device configured to reciprocatively vibrate an operating body movably supported in a first direction and a second direction which are opposite to each other, a driving signal being transmitting to a first interval and a second interval in which vibration frequencies of acceleration during movement of the operating body are different from each other, the first interval being an initial motion interval when the operating body moves toward the first direction, the second interval being an initial motion interval when the operating body moves toward the second direction. The vibration frequency of the second interval is smaller than the vibration frequency of the first interval which is equal to or smaller than 250 Hz, and the vibration frequency of the second interval is greater than the vibration frequency of the first interval which is equal to or greater than 250 Hz.

16 Claims, 4 Drawing Sheets

(56) References Cited

U.S. PATENT DOCUMENTS

2015/0170853 A1* 6/2015 Seo ............... H02K 33/02
　　　　　　　　　　　　　　　　　　　200/521
2015/0293592 A1* 10/2015 Cheong ............ G06F 3/016
　　　　　　　　　　　　　　　　　　　345/173

* cited by examiner

ELECTRONIC APPARATUS AND VIBRATION CONTROL METHOD

CLAIM OF PRIORITY

This application claims benefit of Japanese Patent Application No. 2015-055227 filed on Mar. 18, 2015, which is hereby incorporated by reference.

BACKGROUND OF THE INVENTION

1. Field of the Invention

The present invention relates to an electronic apparatus that gives a sense of touch of a vibration to a finger when a touch operation of an operating body is performed using the finger, and a vibration control method of controlling the vibration.

2. Description of the Related Art

Hitherto, electronic apparatuses with vibration feedback have been proposed which give a sense of touch of a vibration to a finger when the finger is touched to an operating body to thereby bring the operating body into operation.

Among them, an electronic apparatus has been proposed which gives a stimulus to a finger using vibration acceleration capable of being recognized by a Pacinian corpuscle included in the finger for bringing an operating body into operation, thereby allowing an operator to recognize a stimulus.

The Pacinian corpuscle is a receptor observed in the skin, is present sparsely 2 mm or more under the skin, and is able to sense instantaneous stimuli and vibrations. Meanwhile, the peak value of a vibration frequency capable of being sensed by the Pacinian corpuscle is said to be 250 Hz, and a vibration having a vibration frequency closer to 250 Hz has a greater tendency to be sensed.

WO2013/186841 discloses a technique in which information is input by touching a finger to a touch panel in an electronic apparatus such as a smartphone or a cellular phone. The touch panel has a structure in which a vibration is given using a vibration frequency capable of being recognized by the Pacinian corpuscle, and a stimulus is given to a finger for bringing the touch panel into operation.

In the technique disclosed in WO2013/186841, the vibration frequency for giving an acceleration stimulus to the Pacinian corpuscle is always fixed regardless of an elapse of time. According to such a technique, even when a predetermined time has elapsed after the vibration of the touch panel, the acceleration stimulus transmitted to an operator's finger remains in the vibration frequency having a great influence on the Pacinian corpuscle, and thus a vibration transmitted to the finger stays behind. Therefore, there is a problem in that the operator is not able to obtain a sharp and clear operation feeling.

SUMMARY OF THE INVENTION

The present invention provides an electronic apparatus and a vibration control method which are capable of obtaining a sharp and clear operation feeling (sense of touch) when an operator performs a touch operation on an operating body using a finger.

In order to solve the above-mentioned problems of the related art, according to the present invention, there is provided an electronic apparatus including: an operating body movably supported in a first direction and a second direction which are opposite to each other; vibration generating means for reciprocatively vibrating the operating body; and vibration control means for transmitting a driving signal to the vibration generating means, and controlling a vibration of the vibration generating means. The vibration control means transmits a driving signal to a first interval and a second interval in which vibration frequencies of acceleration during movement of the operating body are different from each other. The first interval is an initial motion interval when the operating body moves toward the first direction. The second interval is an initial motion interval when the operating body moves toward the second direction. The vibration frequency of the first interval and the vibration frequency of the second interval satisfy any of the following Expressions (1) and (2).

$$\text{The vibration frequency of the second interval} < \text{the vibration frequency of the first interval} \leq 250 \text{ Hz} \quad (1)$$

$$250 \text{ Hz} \leq \text{the vibration frequency of the first interval} < \text{the vibration frequency of the second interval} \quad (2)$$

According to such a configuration, a stimulus is given to a finger using vibration acceleration capable of being recognized by the Pacinian corpuscle included in the finger for bringing the operating body into operation, and a stimulus (vibration) does not remain therein, thereby allowing a sharp and clear sense of touch to be given to an operator.

Preferably, the vibration generating means includes a transmission member configured to transmit a force to the operating body and an actuator configured to drive the transmission member in the first direction, and is provided with an elastic member capable of being compressed when the transmission member is driven by the actuator in the first direction.

According to such a configuration, it is possible to smoothly perform the movement of the transmission member in the second direction.

Preferably, detection means for detecting movement of the transmission member in a second direction is further provided.

According to such a configuration, the position of a bottom dead center of the transmission member in the first direction is detected, and thus it is possible to send a signal to the vibration control means, and to sharply perform switching of a vibration.

According to the present invention, there is provided a vibration control method of controlling a vibration of vibration generating means for reciprocatively vibrating an operating body movably supported in a first direction and a second direction which are opposite to each other, the method including a step of transmitting a driving signal to a first interval and a second interval in which vibration frequencies of acceleration during movement of the operating body are different from each other, the first interval being an initial motion interval when the operating body moves toward the first direction, the second interval being an initial motion interval when the operating body moves toward the second direction, and the vibration frequency of the first interval and the vibration frequency of the second interval satisfying any of the following Expressions (1) and (2).

$$\text{The vibration frequency of the second interval} < \text{the vibration frequency of the first interval} \leq 250 \text{ Hz} \quad (1)$$

$$250 \text{ Hz} \leq \text{the vibration frequency of the first interval} < \text{the vibration frequency of the second interval} \quad (2)$$

According to such a method, a stimulus is given to a finger using vibration acceleration capable of being recognized by the Pacinian corpuscle included in the finger for bringing an operating body into operation, and a stimulus (vibration) does not remain therein, thereby allowing a sharp and clear sense of touch to be given to an operator.

According to the present invention, it is possible to provide an electronic apparatus and a vibration control method which are capable of obtaining a sharp and clear operation feeling (sense of touch) when an operator performs a touch operation on an operating body using a finger.

DESCRIPTION OF THE PREFERRED EMBODIMENTS

Figure 1:
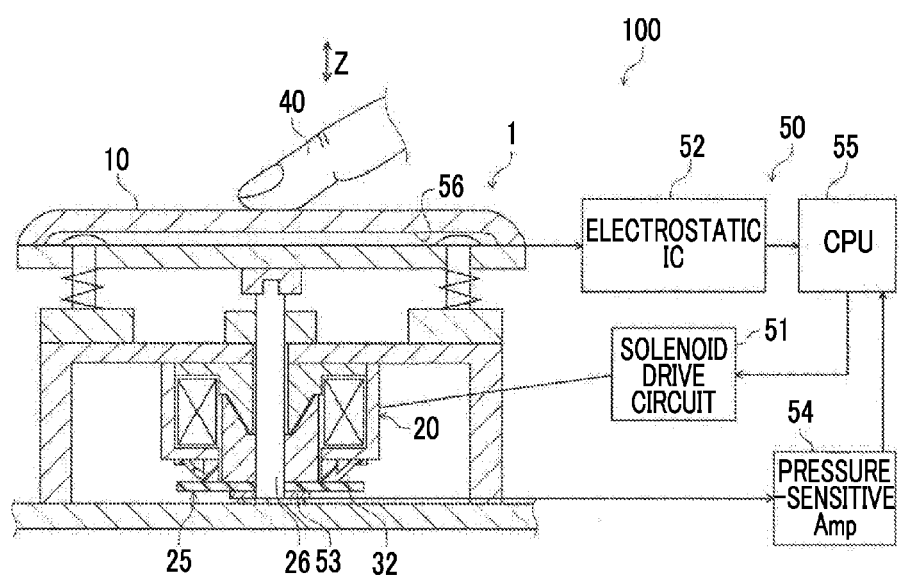
FIG. 1 is a block diagram schematically illustrating an electronic apparatus showing an embodiment of the present invention.
Figure 2:
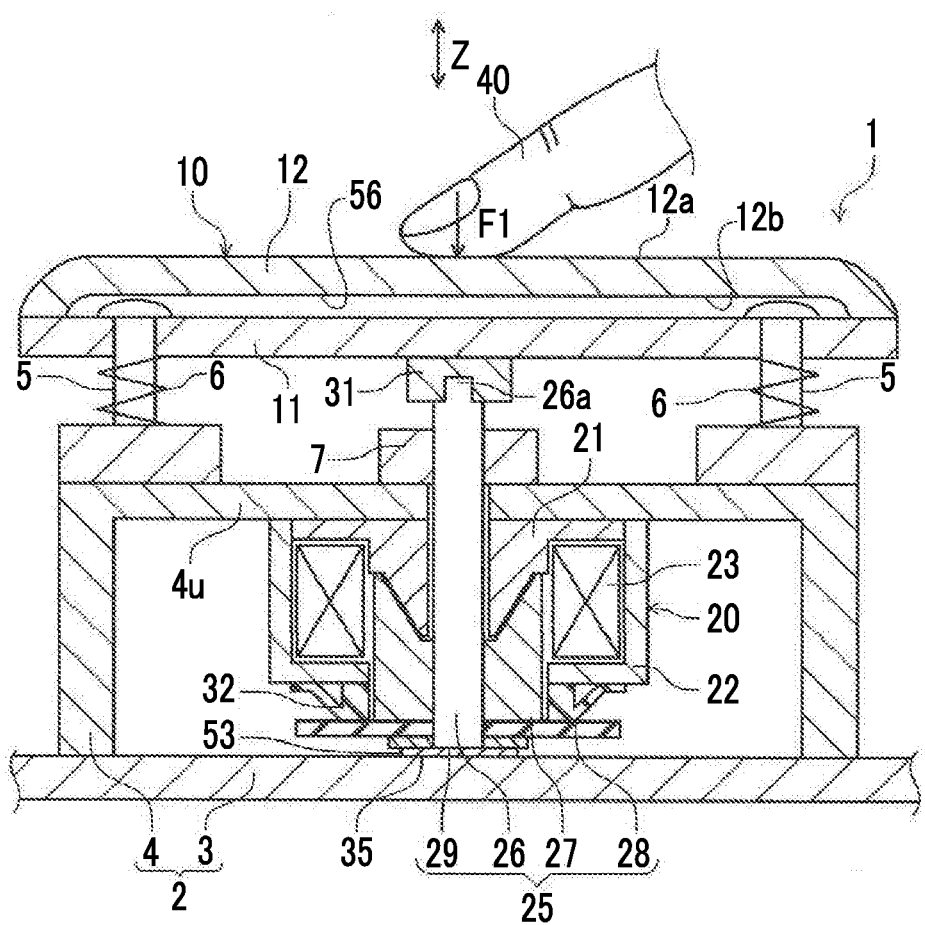
FIG. 2 is a cross-sectional view illustrating a state before the operation of a vibration generating device of the electronic apparatus shown in FIG. 1.
Figure 3:
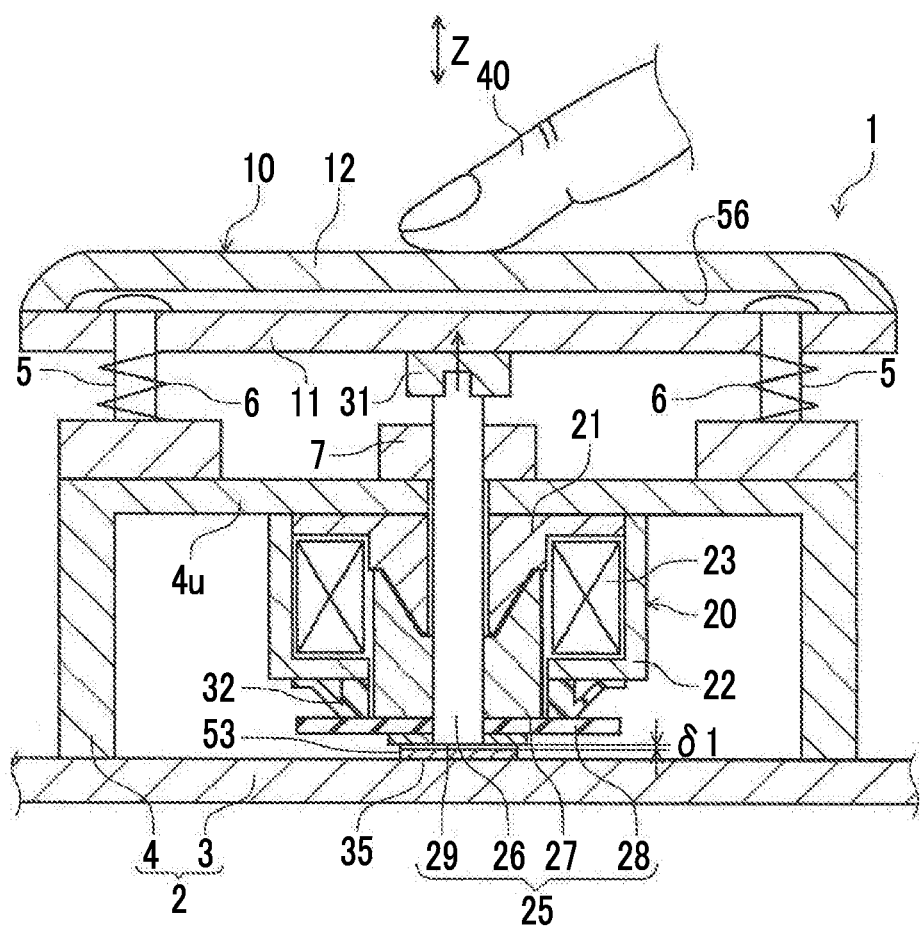
FIG. 3 is a cross-sectional view illustrating a state after the operation of the vibration generating device of the electronic apparatus shown in FIG. 1.

FIG. 1 is a block diagram schematically illustrating an electronic apparatus 100 showing an embodiment of the present invention, FIG. 2 is a cross-sectional view illustrating a state before the operation of a vibration generating device 1 of the electronic apparatus 100, and FIG. 3 is a cross-sectional view illustrating a state after the operation of the vibration generating device 1.

As shown in FIG. 1, the electronic apparatus 100 includes the vibration generating device 1 that gives a vibration to an operating body 10 and a vibration control device 50 that controls the vibration of this vibration generating device 1. The vibration generating device 1 includes an actuator 20 that generates a vibration and a transmission member 25 that transmits the vibration to the operating body 10.

The vibration control device 50 includes a solenoid drive circuit 51 that sends a driving control signal to the actuator 20 of the vibration generating device 1, a coordinate detection device 56 that detects a touch of a finger 40 with the operating body 10, an electrostatic IC 52 to which a detection signal is sent from the coordinate detection device 56, a pressure-sensitive amplifier 54 that amplifies a signal of the pressure-sensitive sensor 53 which is detection means for detecting a movement of the operating body 10, and a CPU 55 that receives a signal from the electrostatic IC 52 and the pressure-sensitive amplifier 54 and sends a driving signal to the solenoid drive circuit 51. The driving of the vibration generating device 1 is controlled by a control signal of the CPU 55, and a vibration is given to the operating body 10.

The solenoid drive circuit 51 transmits a driving signal to a first interval and a second interval in which vibration frequencies of acceleration during the movement of the operating body 10 are different from each other. The first interval is an initial motion interval when the operating body 10 moves toward a first direction, and the second interval is an initial motion interval when the operating body 10 moves toward a second direction. The vibration frequency of the first interval and the vibration frequency of the second interval satisfy any of the following Expressions (1) and (2).

The vibration frequency of the second interval<the vibration frequency of the first interval≤250 Hz   (1)

250 Hz≤the vibration frequency of the first interval<the vibration frequency of the second interval   (2)

The first direction of the operating body 10 means a direction in which a plunger 26 of the transmission member 25 of the vibration generating device 1 is excited, and the plunger 26 moves in a Z direction (upward direction) in FIG. 1 toward the finger 40. In addition, the second direction means the Z direction (downward direction) in FIG. 1 in which the plunger 26 is pulled back, and the plunger 26 moves away from the finger 40.

Expression (1) is a relational expression when the standard strength of a third elastic member 32 is used. As represented in Expression (1), an operator touches the operating body 10 and pushes down the operating body 10, so that the vibration frequency of the first interval which is an initial motion interval in which the plunger 26 moves toward the first direction is set to, for example, 200 Hz which is equal to or lower than 250 Hz. The vibration frequency of the second interval which is an initial motion interval in which the plunger 26 moves toward the second direction is set to be lower than the frequency of the first interval, for example, 100 Hz.

The peak value of the vibration frequency of an acceleration stimulus capable of being sensed by a Pacinian corpuscle is said to be approximately 250 Hz. Therefore, in a case of the first interval in which the vibration frequency of 200 Hz which is a value close to 250 Hz is obtained, the operator can greatly feel a vibration on the finger. When the plunger 26 moves to the interval (second interval) in a direction away from the finger, the vibration frequency is set to 100 Hz lower than the vibration frequency of the first interval, and thus it is not more likely to feel a vibration on the finger than in the first interval.

In addition, Expression (2) is a relational expression when the high strength of the elastic member is used. As represented in Expression (2), the operator touches the operating body 10 and pushes down the operating body 10, so that the vibration frequency of the first interval which is an initial motion interval in which the plunger 26 moves toward the first direction is set to be equal to or higher than 250 Hz. The vibration frequency of the second interval which is an initial motion interval in which the plunger 26 moves toward the second direction is set to be higher than the frequency of the first interval.

Therefore, when the frequency is a frequency close to 250 Hz, the operator can greatly feel a vibration on the finger. When the plunger 26 moves to the interval (second interval) in a direction away from the finger, the vibration frequency is set to be higher than the vibration frequency of the first interval, and thus it is not more likely that the operator feels a vibration on the finger than in the first interval.

As shown in FIG. 2, the vibration generating device is configured such that a bracket 4 is fixed onto a substrate 3, and that a base 2 is constituted by the substrate 3 and the bracket 4.

A plurality of guide shafts 5 are fixed to the upper portion of the bracket 4, and the operating body 10 is guided to the guide shafts 5 and is supported so as to freely move back and forth in the Z direction (vertical direction). The operating body 10 is guided by the plurality of guide shafts 5, and thus is vertically movable while maintaining a horizontal posture.

A biasing spring 6 is provided between the bracket 4 and the operating body 10, and the operating body 10 is biased by the biasing spring 6 upward along a Z-axis.

The operating body 10 is configured such that an operating base member 11 and an operation knob 12 installed thereon are fixed to each other. The operating base member 11 is made of a metal or synthetic resin, and is supported by the plurality of guide shafts 5 so as to be capable of reciprocating in the Z direction. The operation knob 12 is formed of a synthetic resin material, has the coordinate input device 56 such as an electrostatic sensor mounted on its surface 12a or its rear surface 12b, and is configured to be capable of detecting which position on the operation knob 12 the operator's finger 40 touches.

The actuator 20 is fixed onto the lower surface of a ceiling board 4a of the bracket 4. The actuator 20 is a uniaxial driving actuator, and is a solenoid mechanism. As the uniaxial actuator, a voice coil motor or a linear actuator may be used in addition to the solenoid mechanism.

A fixed portion of the actuator 20 which is a solenoid mechanism is constituted by an inside yoke 21 and an outside yoke 22 which are formed of a magnetic metal material, and an exciting coil 23 which is held inside of both the yokes 21 and 22. A movable portion of the actuator 20 includes a transmission member 25. The transmission member 25 is constituted by the plunger 26 that moves back and forth in a Z-axis direction through the inside yoke 21, a movable yoke 27 which is suctioned into the inside yoke 21, a biasing portion 28 fixed to the lower end of the movable yoke 27, and a pressing portion 29 formed on the lower end.

The plunger 26 is a metal shaft. A thrust bearing 7 is fixed onto the upper surface of the bracket 4, and the plunger 26 is slidably supported by the thrust bearing 7. The thrust bearing 7 is constituted by an impregnation bearing which is made of a metal and contains lubricating oil.

A first elastic member 31 is fixed to the upper tip 26a of the plunger 26 constituting the transmission member 25. The first elastic member 31 is formed of synthetic rubber, a foamed synthetic resin, or the like, and is elastically deformable in a compression direction. FIG. 2 shows a state in which electrical conduction to the exciting coil 23 of the actuator 20 is not allowed.

The third elastic member 32 is interposed between the outside yoke 22 and the biasing portion 28 of the transmission member 25. Similarly to the first elastic member 31, the third elastic member 32 is formed of a material, such as synthetic rubber or a foamed synthetic resin, which is elastically deformable in a compression direction. As shown in FIG. 2, when electrical conduction to the exciting coil 23 is not allowed, the transmission member 25 is biased downward so as not to move in a descending state by pressurization which is exerted by the third elastic member 32. Meanwhile, the third elastic member 32 is fixed to the biasing portion 28, and may have a structure in which the upper portion thereof comes into contact with the lower surface of the outside yoke 22 without being fixed thereto.

A second elastic member 35 is provided on the substrate 3 of the base 2. Similarly to the first elastic member 31, the second elastic member 35 is formed of a material, such as synthetic rubber or a foamed synthetic resin, which is elastically deformable in a compression direction.

In this embodiment, the portion of the second elastic member 35 is provided with the pressure-sensitive sensor 53 (detection means). When the transmission member 25 moves further downward from the posture shown in FIG. 2, the second elastic member 35 is pressed by the pressing portion 29 of the transmission member 25. In this case, the pressure-sensitive sensor 53 detects the amount of operation pressure of the plunger 26 of the transmission member 25, and sends the signal to the pressure-sensitive amplifier 54.

Meanwhile, in the present invention, when the second elastic member 35 and the pressure-sensitive sensor 53 are formed separately from each other, and the transmission member 25 is pressed downward, an upward elastic force may be exerted by the second elastic member 35 and the pressure-sensitive sensor 53 operate.

As shown in FIG. 3, when electrical conduction to the exciting coil 23 of the actuator 20 is allowed, the inside yoke 21 is magnetized due to its current magnetic field, the movable yoke 27 is suctioned into the inside yoke 21, and the transmission member 25 ascends along the Z-axis which is the first direction. In this case, a first gap M is formed between the pressing portion 29 of the transmission member 25 and the second elastic member 35.

Figure 4:
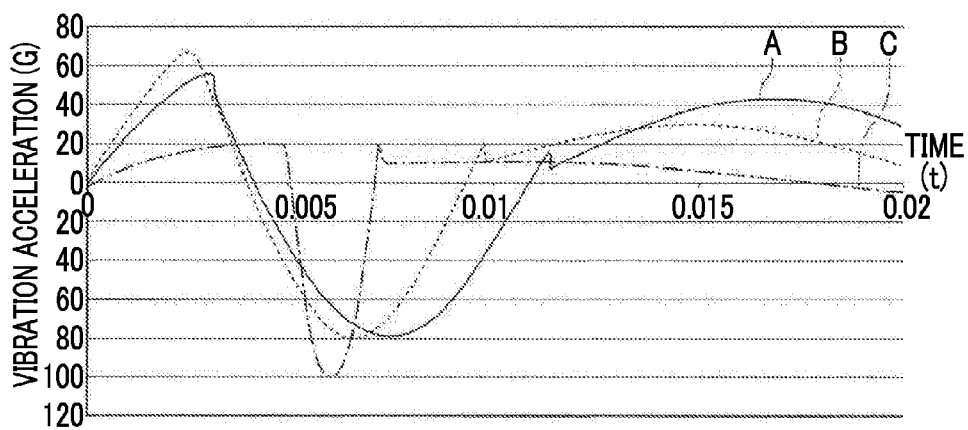
FIG. 4 is a graph illustrating a relationship between a vibration frequency and the hardness of an elastic member used in the electronic apparatus showing the embodiment of the present invention.

Here, reference is now made to FIG. 4 to describe a change in the characteristics of vibration frequency in accordance with the hardness of the third elastic member 32. The solid line A of FIG. 4 shows that the spring attitude of the third elastic member 32 is standard, the broken line B shows that the hardness of the second elastic member 32 is a hardness of ½ times the spring hardness of the solid line, and the dashed-dotted line C shows that the hardness of the second elastic member 32 is a hardness of 8 times the practical spring hardness. In FIG. 4, the standard spring hardness shows that the pushing-up speed of the operating body 10 caused by the ascent of the plunger 26 and the descending speed of the plunger 26 are balanced. The low hardness can cause the operating body 10 to be easily pushed up together with the ascent of the plunger 26, which leads to fast arrival at the peak value of vibration acceleration. However, since a repulsive force becomes weaker to that extent, the descent of the plunger 26 becomes slower. The high hardness causes time to be taken to push up the operating body 10, which leads to late arrival at the peak value of vibration acceleration. However, the repulsive force becomes higher, and the descent of the plunger 26 becomes faster.

Next, an operation and a vibration control method of the vibration generating device 1 will be described. As shown in FIG. 2, when electrical conduction to the exciting coil 23 of the actuator 20 is not allowed, the transmission member 25 descends, and downward pressurization is given to the transmission member 25 from the third elastic member 32.

When the finger 40 is touched to the surface 12a of the operation knob 12, the touch of the finger 40 is detected by the coordinate detection device 56 such as an electrostatic sensor which is mounted on the operation knob 12. The detection signal is sent to the electrostatic IC 52. When the finger 40 is brought into operation along the surface 12a, the movement state of the touch position of the finger 40 is detected by the coordinate detection device 56. When the finger 40 is caused to move on the surface 12a of the operation knob 12, a cursor display moves on a display screen which is not shown. After the cursor display is caused to move to the position of any menu display, it is possible to perform a selection determination operation of a menu by pressing the operation knob 12 using a downward force F1 in FIG. 2.

As shown in FIG. 2, when the downward pressing force F1 is given to the operating body 10 in the pressing operation of the finger 40, the operating base member 11 is guided to the guide shafts 5 and descends. Then, the operating body 10 is caused to move downward through the first elastic member 31 together with the transmission member 25. The second elastic member 35 is pressed in the pressing portion 29 of the transmission member 25, the pressure-sensitive sensor 53 detects the touch, and a switching signal is generated. The switching signal is sent to the CPU 55 through the pressure-sensitive amplifier 54. Then, the solenoid drive circuit 51 starts up, and a driving current is given to the exciting coil 23 of the actuator 20. This driving current has a pulse shape for a short time and is given only one shot.

When electrical conduction to the exciting coil 23 is allowed, as shown in FIG. 3, the movable yoke 27 is suctioned into the inside yoke 21, the transmission member 25 is lifted up, the operating base member 11 of the operating body 10 is pushed upward by the first elastic member 31 fixed to the upper tip 26a of the plunger 26, and bending is given to the operating body 10 in a state where the first elastic member 31 is contracted and the third elastic member 32 is contracted.

Such a state is the first interval which is an initial motion interval in which the plunger 26 moves toward the first direction (Z direction in FIG. 3, upward direction). In this interval, the vibration frequency which is applied to the operating body 10 is set to 200 Hz, and is set to a value close to 250 Hz which is the peak of the vibration frequency of acceleration capable of being sensed by the Pacinian corpuscle. Therefore, the operator can feel a sense of touch (vibration) on the finger 40.

Immediately after that, when electrical conduction to the exciting coil 23 is cut off, and the suction force of a solenoid mechanism is released, the transmission member 25 moves downward due to the elastic restoring force of the first elastic member 31 contracted, the bending elastic force of the operating body 10, and the elastic restoring force of the third elastic member 32, and the second elastic member 35 is contracted in the pressing portion 29 on the lower end of the transmission member 25.

Such a state is the second interval which is an initial motion interval in which the plunger 26 moves toward the second direction (Z direction in FIG. 3, downward direction). In this interval, the vibration frequency which is applied to the operating body 10 is set to 100 Hz lower than the vibration frequency of the first interval. This vibration frequency is set to a value far away from 250 Hz which is the peak value of the vibration frequency obtained by the Pacinian corpuscle, and thus the operator is not able to feel a vibration on the finger 40.

Therefore, when the operator touches and operates the operating body 10, the operator feels only an initial vibration frequency given to the operating body 10 in the Pacinian corpuscle, and thus it is possible to obtain a sharp and clear operation feeling (sense of touch) on the finger 40.

Meanwhile, when the vibration frequency of the first interval is set to be higher than 250 Hz and the vibration frequency of the second interval is set to be higher than the vibration frequency of the first interval even in a case where the hardness of the third elastic member 32 is high, it is possible to greatly feel a vibration during the movement of the operating body 10 in the first direction, and thus it is not likely to feel a vibration during the movement of the operating body 10 in the second direction. Therefore, it is possible to obtain a sharp and clear operation feeling (sense of touch) on the finger 40.

The present invention is not limited to the aforementioned embodiment. That is, those skilled in the art may variously change, combine, sub-combine, and substitute the components of the aforementioned embodiment within the technical scope of the present invention or its equivalents.

The present invention can be applied to various electronic apparatuses without being limited to a consumer electronic apparatus and an in-vehicle electronic apparatus, insofar as a finger touches an operating body and the operating body is brought into operation.

It should be understood by those skilled in the art that various modifications, combinations, sub-combinations and alterations may occur depending on design requirements and other factors insofar as they are within the scope of the appended claims of the equivalents thereof.

What is claimed is:

1. An electronic apparatus comprising:
   an operating body movably supported on a base, the operating body being moveable in a first direction and a second direction opposite to the first direction;
   a vibration generating unit configured to generate vibration, the vibration generating unit including:
      a transmission member movable in the first and second directions so as to apply the vibration to the operating body;
      an actuator configured to drive the transmission member in the first direction; and
      a first elastic member provided between the transmission member and the operating body, the first elastic member being configured to be compressed when the transmission member is driven in the first direction; and
   a driving control unit configured to supply a driving signal to the actuator to accelerate the transmission member in the first direction during a first time period so as to apply the vibration having a first frequency to the operating body via the first elastic member during the first time period, the transmission member thereafter being accelerated in the second direction during a second time period following the first time period, thereby applying the vibration having a second frequency to the operating body during the second time period,
   wherein the second frequency is lower than the first frequency, and the first frequency is equal to or lower than 250 Hz, thereby providing a less vibration feel during the second time period compared with the first time period so as to provide a sharp touch feel.

2. The electronic apparatus according to claim 1, further comprising:
   a sensor configured to detect a movement of the transmission member in the second direction.

3. A method of controlling a vibration generating unit configured to apply vibration to an operating body movably supported on a base, the operating body moving in a first direction and a second direction opposite to the first direction, the vibration generating unit including an actuator and a transmission member movable in the first and second directions and configured to apply the vibration to the operating body, the method comprising:
   accelerating the transmission member in the first direction during a first time period by transmitting a driving signal to the actuator during the first time period such that the vibration having a first frequency is applied to the operating body during the first time period;
   accelerating the transmission member in the second direction during a second time period following the first time period such that the vibration having a second frequency is applied to the operating body during the second time period,
   wherein the second frequency is lower than the first frequency, and the first frequency is equal to or lower than 250 Hz, thereby providing a less vibration feel during the second time period compared with the first time period so as to provide a sharp touch feel.

4. The electronic apparatus according to claim 2, wherein the vibration generating unit further includes:
a second elastic member configured to be compressed in the second direction when the transmission member moves in the second direction.

5. The electronic apparatus according to claim 4, wherein the actuator is activated when the sensor detects that the second elastic member is pressed in the second direction by the transmission member.

6. The electronic apparatus according to claim 1, wherein the vibration generating unit further includes:
a third elastic member configured to bias the transmission member in the second direction.

7. The method according to claim 3, wherein the vibration having the first frequency is applied to the operating body via a first elastic member provided between the transmission member and the operating body during the first time period.

8. The method according to claim 3, wherein the accelerating the transmission member in the first direction includes:
detecting a movement of the transmission member in the second direction via a second elastic member compressed by the transmission member; and
activating the actuator to accelerate the transmission member in the first direction in response to the detection of the compression of the second elastic member.

9. The method according to claim 7, wherein the accelerating the transmission member in the first direction includes:
compressing the first elastic member; and
compressing a third elastic member configured to bias the transmission member in the second direction.

10. The method according to claim 9, wherein in the accelerating the transmission member in the second direction, the transmission member is accelerated in the second direction by an elastic restoring force of the first elastic member and an elastic restoring force of the third elastic member.

11. The electronic apparatus according to claim 1, wherein the first frequency is equal to or higher than 200 Hz.

12. The electronic apparatus according to claim 1, wherein the second frequency is 100 Hz.

13. The method according to claim 3, wherein the first frequency is equal to or higher than 200 Hz.

14. The method according to claim 3, wherein the second frequency is 100 Hz.

15. An electronic apparatus comprising:
an operating body movably supported on a base, the operating body being moveable in a first direction and a second direction opposite to the first direction;
a vibration generating unit configured to generate vibration, the vibration generating unit including:
a transmission member movable in the first and second directions so as to apply the vibration to the operating body;
an actuator configured to drive the transmission member in the first direction; and
a first elastic member provided between the transmission member and the operating body, the first elastic member being configured to be compressed when the transmission member is driven in the first direction; and
a driving control unit configured to supply a driving signal to the actuator to accelerate the transmission member in the first direction during a first time period so as to apply the vibration having a first frequency to the operating body via the first elastic member during the first time period, the transmission member thereafter being accelerated in the second direction during a second time period following the first time period, thereby applying the vibration having a second frequency to the operating body during the second time period,
wherein the second frequency is higher than the first frequency, and the first frequency is higher than 250 Hz, thereby providing a less vibration feel during the second period compared with the first period so as to provide a sharp touch feel.

16. A method of controlling a vibration generating unit configured to apply vibration to an operating body movably supported on a base, the operating body moving in a first direction and a second direction opposite to the first direction, the vibration generating unit including an actuator and a transmission member movable in the first and second directions and configured to apply the vibration to the operating body, the method comprising:
accelerating the transmission member in the first direction during a first time period by transmitting a driving signal to the actuator in the first time period such that the vibration having a first frequency is applied to the operating body during the first time period;
accelerating the transmission member in the second direction during a second time period following the first time period such that the vibration having a second frequency is applied to the operating body during the second time period,
wherein the second frequency is higher than the first frequency, and the first frequency is higher than 250 Hz, thereby providing a less vibration feel during the second time period compared with the first time period so as to provide a sharp touch feel.

* * * * *